(12) United States Patent
Starman

(10) Patent No.: US 10,526,064 B2
(45) Date of Patent: Jan. 7, 2020

(54) ACTUATING SYSTEM FOR AN ACTUATABLE DOOR AND AN ACTUATABLE DOOR HAVING SUCH AN ACTUATING SYSTEM

(71) Applicant: AIRBUS HELICOPTERS DEUTSCHLAND GMBH, Donauworth (DE)

(72) Inventor: Darko Starman, Grossraming (AT)

(73) Assignee: AIRBUS HELICOPTERS DEUTSCHLAND GMBH, Donauworth (DE)

(*) Notice: Subject to any disclaimer, the term of this patent is extended or adjusted under 35 U.S.C. 154(b) by 899 days.

(21) Appl. No.: 14/994,375

(22) Filed: Jan. 13, 2016

(65) Prior Publication Data

US 2016/0201364 A1 Jul. 14, 2016

(30) Foreign Application Priority Data

Jan. 14, 2015 (EP) .................................... 15400003

(51) Int. Cl.
*B64C 1/14* (2006.01)
*E05B 15/00* (2006.01)
(Continued)

(52) U.S. Cl.
CPC .......... *B64C 1/1461* (2013.01); *B64C 1/1415* (2013.01); *E05B 15/0086* (2013.01);
(Continued)

(58) Field of Classification Search
CPC ... E05C 19/12; E05C 3/12; E05C 3/14; E05C 9/08; E05C 9/1891; E05C 19/10;
(Continued)

(56) References Cited

U.S. PATENT DOCUMENTS 4,053,177 A * 10/1977 Stammreich .......... E05C 19/145
292/113
4,268,077 A * 5/1981 Bohleen .................. E05B 13/10
292/210
(Continued)

FOREIGN PATENT DOCUMENTS

DE 19825405 8/2000
DE 19944615 4/2001
(Continued)

OTHER PUBLICATIONS

European Search Report for European Application No. EP 15400003, Completed by the European Patent Office on Jun. 26, 2015, 6 Pages.
(Continued)

*Primary Examiner* — Kristina R Fulton
*Assistant Examiner* — Faria F Ahmad
(74) *Attorney, Agent, or Firm* — Brooks Kushman P.C.

(57) ABSTRACT

An actuating system for an actuatable door that comprises at least one latching device with a latching hook that is adapted for locking the actuatable door in a closed position, the latching hook being pivotally mounted to an associated pivot bearing and connected to a pivotable mechanical transmission element via a coupling link, which is pivotally mounted to the latching hook and to the pivotable mechanical transmission element, the pivotable mechanical transmission element being coupled to a rotatable latching shaft, wherein rotation of the rotatable latching shaft in operation results in pivoting of the pivotable mechanical transmission element and pivoting of the latching hook around the associated pivot bearing, wherein the pivotable mechanical transmission element is mounted onto the rotatable latching shaft. The invention is further related to an actuatable door having such an actuating system.

9 Claims, 4 Drawing Sheets

(51) Int. Cl.
  *E05C 9/08* (2006.01)
  *E05C 19/10* (2006.01)
  *E05B 83/02* (2014.01)
  *E05C 9/18* (2006.01)
  *E05B 65/00* (2006.01)

(52) U.S. Cl.
  CPC ............ *E05B 65/001* (2013.01); *E05B 83/02* (2013.01); *E05C 9/08* (2013.01); *E05C 9/1891* (2013.01); *E05C 19/10* (2013.01); *Y10T 292/086* (2015.04); *Y10T 292/0826* (2015.04); *Y10T 292/0828* (2015.04); *Y10T 292/0848* (2015.04); *Y10T 292/0849* (2015.04); *Y10T 292/0853* (2015.04); *Y10T 292/0857* (2015.04); *Y10T 292/0911* (2015.04); *Y10T 292/0945* (2015.04); *Y10T 292/0946* (2015.04); *Y10T 292/0948* (2015.04); *Y10T 292/0949* (2015.04); *Y10T 292/0951* (2015.04); *Y10T 292/108* (2015.04); *Y10T 292/1043* (2015.04); *Y10T 292/1047* (2015.04); *Y10T 292/1075* (2015.04); *Y10T 292/1076* (2015.04); *Y10T 292/1078* (2015.04)

(58) Field of Classification Search
  CPC . B64C 1/1415; E05B 83/02; Y10T 292/0911; Y10T 292/0945; Y10T 292/0946; Y10T 292/0948; Y10T 292/0949; Y10T 292/0951; Y10T 292/1043; Y10T 292/1075; Y10T 292/1076; Y10T 292/1078; Y10T 292/108; Y10T 292/1047; Y10T 292/0848; Y10T 292/0849; Y10T 292/0853; Y10T 292/0857; Y10T 292/086; Y10T 292/0826; Y10T 292/082
  USPC ....... 292/95, 96, 97, 99, 100, 101, 194, 195, 292/196, 198, 200, 216, 44, 45, 48, 52, 292/54, 25, 26
  See application file for complete search history.

(56) References Cited

U.S. PATENT DOCUMENTS

| | | | |
|---|---|---|---|
| 4,510,779 A * | 4/1985 | Ahad | E05B 5/00 292/DIG. 31 |
| 4,758,030 A | 7/1988 | Kupfernagel | |
| 5,577,782 A | 11/1996 | Johnson et al. | |
| 5,984,382 A * | 11/1999 | Bourne | B64D 29/06 292/113 |
| 6,343,815 B1 * | 2/2002 | Poe | E05C 19/145 292/113 |
| 6,454,210 B1 * | 9/2002 | Plattner | B64C 1/1415 244/129.5 |
| 8,864,185 B2 * | 10/2014 | Do | B64C 1/1446 292/105 |
| 8,864,189 B2 * | 10/2014 | Fournie | E05C 19/145 292/256.69 |
| 9,004,548 B2 * | 4/2015 | Joret | B64D 29/06 292/96 |
| 9,567,784 B2 * | 2/2017 | DeFrance | E05C 19/145 |
| 9,677,306 B2 * | 6/2017 | DeFrance | E05C 19/10 |
| 2003/0146643 A1 | 8/2003 | Dietl | |
| 2008/0129056 A1 * | 6/2008 | Hernandez | E05B 63/143 292/98 |
| 2010/0171319 A1 * | 7/2010 | Joret | B64D 29/06 292/96 |
| 2010/0289274 A1 * | 11/2010 | Shafry | E05B 81/14 292/194 |
| 2012/0102842 A1 * | 5/2012 | Fournie | E05C 19/145 49/503 |
| 2013/0056994 A1 * | 3/2013 | Sago | E05B 77/34 292/101 |
| 2013/0076045 A1 * | 3/2013 | Torka | E05B 77/36 292/96 |
| 2013/0161961 A1 * | 6/2013 | Burciaga | E05B 77/32 292/100 |
| 2015/0175174 A1 * | 6/2015 | Matoba | B61D 17/00 292/45 |
| 2015/0218856 A1 * | 8/2015 | Sayama | E05B 79/08 292/96 |
| 2016/0024819 A1 * | 1/2016 | Rosales | E05B 77/06 292/92 |

FOREIGN PATENT DOCUMENTS

| | | |
|---|---|---|
| EP | 0222160 A2 | 5/1987 |
| EP | 0222160 A3 | 6/1998 |

OTHER PUBLICATIONS

European Aviation Safety Agency Amendment 17, Jul. 15, 2015, 1023 Pages, "Certification Specifications and Acceptable Means of Compliance for Large Aeroplanes CS-25".

European Aviation Safety Agency Amendment 17, Jul. 15, 2015, 3 Pages, CS-25 Book 1 "CS 25.783 Fuselage Doors".

European Aviation Safety Agency Amendment 17, Jul. 15, 2015, 12 Pages, CS-25 Book 2, "CS 25.783(c) Pressurisation prevention means".

European Aviation Safety Agency Amendment 17, Jul. 15, 2015, 1 Page, CS-25 Book 2, "European Aviation Safety Agency (EASA) Documents".

\* cited by examiner

US 10,526,064 B2

ACTUATING SYSTEM FOR AN ACTUATABLE DOOR AND AN ACTUATABLE DOOR HAVING SUCH AN ACTUATING SYSTEM

CROSS REFERENCE TO RELATED APPLICATION

This application claims priority to European patent application No. 15 400003.8 filed on Jan. 14, 2015, the disclosure of which is incorporated in its entirety by reference herein.

BACKGROUND OF THE INVENTION (1) Field of the Invention

The invention is related to an actuating system for an actuatable door, said actuating system comprising the features of claim 1. The invention is further related to an actuatable door, in particular for an aircraft, said actuatable door having such an actuating system and comprising the features of claim 15.

(2) Description of Related Art

Actuatable doors and, in particular, actuatable cargo doors in aircrafts usually fulfill the following major functions: They close the aircrafts in operation for maintaining a required internal pressure therein, they contribute to carrying flight loads in corresponding lower deck cargo compartments and they allow external access to the corresponding lower deck cargo compartments. Therefore, robust and safe actuating systems are required for reliably and safely closing the actuatable doors in operation, but also for fulfilling all relevant requirements defined by the competent authorities, such as e.g. in EASA CS 25.783 related to fuselage doors in general.

More specifically, according to EASA CS 25.783d (2) such actuating systems require latching hooks and corresponding latching devices that must be designed so that, under all aircraft flight and ground loading conditions, there is no force or torque tending to unlock the latching hooks in closed state of the actuatable door. In addition, the latching devices must include means for securing the latching hooks in an associated locked state. These means must be independent of the latching devices.

Furthermore, according to EASA CS 25.783d (5), locking members such as locking cams must be provided for locking the latching hooks in the associated locked state. However, any positioning of the locking members in a locking position, wherein the locking members lock the latching hooks, must be prevented as long as the latching hooks and the corresponding latching devices are not in their associated locked state.

The document DE 198 25 405 C2 describes a conventional actuating system for an actuatable door that fulfills these requirements and comprises a plurality of latching devices, each being provided with an associated latching hook that is adapted for locking the actuatable door in a closed position. Each latching hook is securable in its locked state by means of a separate rotatable locking device, which is implemented as a locking cam.

More specifically, each latching hook is pivotally mounted to a first pivot bearing and connected to a pivotable mechanical transmission element via a coupling link. The latter is implemented as a first coupling rod and on the one hand pivotally mounted to the latching hook by means of a second pivot bearing and on the other hand to the pivotable mechanical transmission element by means of a third pivot bearing. The pivotable mechanical transmission element is implemented as a bell crank, which is pivotable around an associated bell crank bolt defining a fourth pivot bearing. The bell crank is further coupled to a latch lever by means of a coupling link, which is implemented as a second coupling rod. The latter is on the one hand pivotally mounted to the bell crank by means of a fifth pivot bearing and on the other hand to the latch lever by means of a sixth pivot bearing. The latch lever is coupled to a rotatable latching shaft, which defines a seventh bearing of the conventional actuating system.

The documents EP 0 222 160 A2, US 2003/146643 A1 and DE 199 44 615 A1 also describe conventional actuating systems. These conventional actuating systems are, however, similar to the one described in the document DE 198 25 405 C2 and are, therefore, not described in more detail for brevity and conciseness.

When operating the conventional actuating system according to the document DE 198 25 405 C2 for locking the actuatable door in the closed position, the rotatable latching shaft is rotated in a predetermined rotational direction, thereby rotating the latch lever also into this predetermined rotational direction until the latch lever and the second coupling rod are in-line. The rotating latch lever entrains the second coupling rod, which in turn entrains the bell crank, thereby pivoting the latter into an opposed rotational direction. The pivoting bell crank thereby pushes the first coupling rod such that the latter rotates the latching hook also into this opposed rotational direction until the latching hook reaches a locking position, wherein the actuatable door is locked in the closed position. Subsequently, the locking cam is rotated in a securing position for securing and blocking the latching hook in its locked state.

For further securing and blocking the latching hook in its locked state such that the latching hook cannot be rotated accidentally or involuntarily from its locking position back into a releasing position, wherein the actuatable door can be opened, the first coupling rod is driven by the pivoting bell crank into a so-called "overcentered" position. This is done by shortening or lengthening the second coupling rod.

More specifically, the overcentered position is defined such that any rotation of the latching hook in the above described predetermined rotational direction for unlocking the latching hook due to an external force acting on the latching hook, would only lead to a further rotation of the bell crank into the above described opposed rotational direction, which is prevented by means of the second coupling rod and the latch lever. In other words, when the first coupling rod is in the overcentered position, the latching hook can only be driven from its locking position into its releasing position by rotating the latch lever into the above described opposed rotational direction by means of the rotatable latching shaft.

However, the above described conventional actuating system is comparatively complicated and expensive, as each latching device thereof, i.e. without the separate rotatable locking device, comprises multiple constituent components including five moving parts in row with seven bearings involved, count starting with the rotatable latching shaft, adding up all individual tolerances of these constituent components. Consequently, this conventional actuating system is comparatively heavy and volume consuming and manufacturing and assembly thereof is rather complicated due to the great number of components and tolerances. Furthermore, every opening in the latching device of the conventional actuating system that is used to define one of the above described bearings leads in the vertical stress load path defined by the latching device to an increased material thickness of a corresponding component, as this is required for compensating weakening effects of the openings.

It is, therefore, an object of the present invention to provide a new actuating system for an actuatable door that comprises less constituent components, is easier to produce and assemble and comparatively inexpensive to manufacture. Furthermore, it is an object of the present invention to provide a new actuatable door comprising such a new actuating system.

This object is solved by an actuating system for an actuatable door, said actuating system comprising the features of claim 1.

More specifically, according to the present invention an actuating system for an actuatable door comprises an actuatable rotatable latching shaft and at least one latching device, the at least one latching device comprising a latching hook, an associated pivot bearing, a pivotable mechanical transmission element and a coupling link, wherein the latching hook is adapted for locking the actuatable door in a closed position. The latching hook is pivotally mounted to the associated pivot bearing and connected to the pivotable mechanical transmission element via the coupling link. The coupling link is pivotally mounted to the latching hook and to the pivotable mechanical transmission element. The pivotable mechanical transmission element is coupled to the rotatable latching shaft such that rotation of the rotatable latching shaft in operation upon actuation results in pivoting of the pivotable mechanical transmission element and pivoting of said latching hook around said associated pivot bearing. The pivotable mechanical transmission element is mounted onto the rotatable latching shaft.

Advantageously, the actuating system according to the present invention comprises latching devices with a reduced number of constituent components compared to the above described conventional actuating system, while still fulfilling all relevant requirements defined by the competent authorities, such as e.g. in EASA CS 25.783.

More specifically, according to the present invention, the rotatable latching shaft is moved respectively integrated into the rotation axis of the mechanical transmission element, which is preferably implemented by a bell crank. Thus, compared to the latching device of the conventional actuating system described above, an underlying total number of constituent components can be reduced by five, as the fifth through seventh bearings, the latch lever and the second coupling rod of the conventional actuating system are no more required. Furthermore, the mechanical transmission element, i.e. the bell crank can be simplified with respect to the bell crank known from the conventional actuating system described above, as a corresponding attachment part for attachment to the second coupling rod is no more required.

In other words, the inventive latching device has a shorter design and consists of a reduced number of constituent components including only three moving parts in row with four bearings involved, count starting with the rotatable latching shaft, adding up the individual component tolerances. One of the moving parts, i.e. the mechanical transmission element, has a simpler configuration and a reduced size. Due to these differences, the inventive latching device is lighter, requires less installation space, and is simpler and cheaper than the one known from the conventional actuating system. Consequently, the inventive actuating system as a whole is lighter, requires less installation space, and is simpler and cheaper than the conventional actuating system.

Advantageously, an associated handle part for manually actuating the actuating system according to the present invention can be implemented up to the rotatable latching shaft by means of a conventional handle part that is, e.g., described in the document DE 198 25 405 C2. Thus, an initial or initiating rotation of the rotatable latching shaft is preferably realized manually, i.e. by hand force. Furthermore, the locking device that is associated with each latching device of the actuating system according to the present invention can also be implemented by the locking device that is, e.g., described in the document DE 198 25 405 C2.

However, it should be noted that implemented locking mechanics are preferably at least similar to those described in the document DE 198 25 405 C2. This likewise applies to underlying lock and interlock solutions.

BRIEF SUMMARY OF THE INVENTION

According to a preferred embodiment, the pivotable mechanical transmission element comprises at least one bell crank.

According to a further preferred embodiment, the coupling link comprises at least one coupling rod.

According to a further preferred embodiment, the pivotable mechanical transmission element is pivotable relative to the rotatable latching shaft up to a predetermined maximum angle of rotation. The predetermined maximum angle of rotation is greater than 0°.

According to a further preferred embodiment, the predetermined maximum angle of rotation is greater than a minimum required overcentering angle under consideration of all accumulated tolerances of all involved elements.

In order to guarantee that the latching hook is prevented from an uncontrolled, i.e. unintended and/or accidental unlatching by a back driving force acting thereon, the coupling link, i.e. the coupling rod, and the bell crank are preferably overcentered. An overcentering is given if an axis defined by the coupling link lies below a direct line drawn between the rotation axis of the bell crank and the rotation axis of the coupling link at the latching hook. Such an overcentering is an additional safety action preventing the latching hook from an uncontrolled unlatching.

According to a further preferred embodiment, an overcentering adjustment device is provided. The overcentering adjustment device is adapted for pivoting the pivotable mechanical transmission element in operation at least from an in-line position into an overcentered position. The in-line position corresponds to a first position, wherein the latching hook is in locked state and unlocking due to a back driving force acting on the latching hook is possible. The overcentered position corresponds to a second position, wherein the latching hook is in the locked state and unlocking due to a back driving force acting on the latching hook is prevented.

According to a further preferred embodiment, the overcentering adjustment device comprises at least one overcentering bolt that is rigidly mounted to the rotatable latching shaft. The at least one overcentering bolt passes at least partly through an overcentering hole provided in the pivotable mechanical transmission element.

According to a further preferred embodiment, the overcentering hole is provided as a long hole oriented at least approximately perpendicular to a longitudinal extension of the rotatable latching shaft.

According to a further preferred embodiment, the at least one overcentering bolt and the long hole are movable relative to each other.

According to a further preferred embodiment, at least one overcentering slider is provided. The overcentering slider is preferably coupled to the at least one overcentering bolt.

According to a further preferred embodiment, the at least one overcentering slider comprises at least one overcentering guide opening. The at least one overcentering guide opening is embodied as a long hole that is oriented transversely to the overcentering hole.

According to a further preferred embodiment, the at least one overcentering slider is movably arranged on the pivotable mechanical transmission element. A longitudinal movement of the overcentering slider in operation is transformed into pivoting of the pivotable mechanical transmission element relative to the rotatable latching shaft.

Preferably, the inventive overcentering adjustment device comprises two sliders that are each movable in an associated guide structure, preferentially a guide groove that is machined on an outer surface of the bell crank. Each slider is preferably provided with at least one tilted slot hole defining its overcentering guide opening respectively the corresponding long hole. The bell crank is likewise provided with at least one corresponding slot hole defining its overcentering hole respectively long hole that is arranged at the circumference of the bell crank orientated 90° relative to the center axis of the bell crank respectively the rotatable latching shaft. Additionally, the rotatable latching shaft preferably comprises at least one through hole, which is arranged congruent to the bell crank slot hole. Preferentially, the rotatable latching shaft, the bell crank and the two sliders are connected to each other by means of at least one overcentering bolt, which is rigidly attached to the rotatable latching shaft.

In operation, by moving the two sliders longitudinally in parallel to the rotation axis of the rotatable latching shaft in their corresponding guide grooves, the tilted slot hole in the sliders work as supporting ramp for the overcentering bolt and the sliders. Because the overcentering bolt is fixed in the through hole of the rotatable latching shaft, the movement of the two sliders forces the bell crank indirectly to rotate relative to the rotatable latching shaft. After the bell crank is rotated into a predefined rotational position, the sliders are fixed by bolt nuts at the bell crank in a form fit connection.

According to a further preferred embodiment, at least one overcentering shim holder is provided. The overcentering shim holder is coupled to the at least one overcentering bolt and comprises at least two lateral shim pockets.

Preferably, corresponding shims are in the lateral shim pockets, so that an underlying distribution of the shim package can be used to force rotation of the bell crank. For this variant no modification of a given bell crank main body is needed. The slotted holes and the guide grooves in the bell crank can be configured as described above. However, a maximum possible tilting is defined by a total depth of the lateral shim pockets with a respective distribution of the corresponding shims to one side or the other.

According to a further preferred embodiment, at least one locking device is provided. The locking device comprises a locking cam for locking the latching hook in locked state.

The present invention further provides an actuatable door, in particular for an aircraft, comprising an actuating system as described above.

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
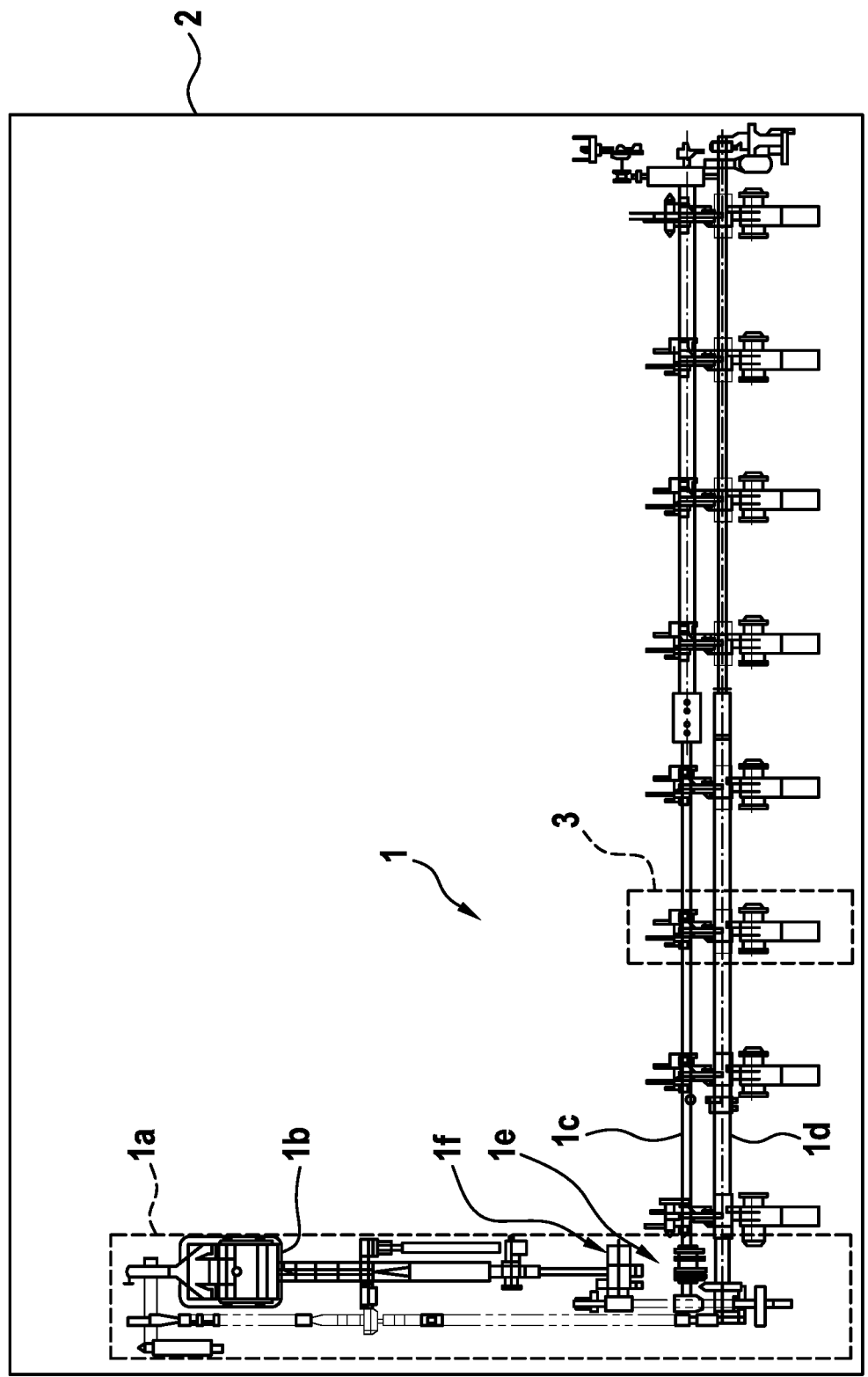
FIG. 1 shows a schematic view of an actuatable door with an actuating system having a latching device and a locking device according to the present invention.

FIG. 1 shows an actuating system 1 for an actuatable door 2 according to the present invention. The actuating system 1 is preferably adapted for reliably and securely locking said actuatable door 2 in a closed position, such that the actuatable door 2 preferentially fulfills all relevant requirements defined by the competent authorities, such as e.g. in EASA CS 25.783.

The actuatable door 2 is preferably adapted to close an associated door mounting structure, such as a fuselage of an aircraft, preferentially in a fluid-tight manner. According to one aspect, the actuatable door 2 is a cargo door of an aircraft and, therefore, also referred to as the "cargo door" 2 hereinafter, for simplicity and clarity. However, it should be noted that not only the cargo door 2, but various other actuatable doors, in particular actuatable doors in vessels, such as ships and so on, can be equipped with the inventive actuating system 1, so that the present invention should not be construed as being restricted to the cargo door 2.

Illustratively, the actuating system 1 comprises an actuating device 1a with an operating handle 1b, which is adapted for actuating respectively rotating at least one rotatable latching shaft 1c and at least one rotatable locking shaft 1d in operation. Advantageously, the actuating device 1a can be implemented by a conventional actuating device which is well-known to the person skilled in the art. More specifically, the actuating device 1a can be implemented by the conventional actuating device described in the document DE 198 25 405 C2, the teachings of which are explicitly introduced and incorporated into the present description as integral part thereof.

However, it should be noted that the conventional actuating device of the document DE 198 25 405 C2 illustrates and describes a certain distance between corresponding latching and locking shafts, which is greater than the distance between the at least one rotatable latching shaft 1c and the at least one rotatable locking shaft 1d of the actuating device 1a. Therefore, the actuating device 1a is slightly modified with respect to the conventional actuating device of the document DE 198 25 405 C2 and now preferably comprises a deflection device 1e, which is mounted between a latching shaft carrier 1f that is already used in the conventional actuating device of the document DE 198 25 405 C2 and the at least one latching shaft 1c according to the present invention. However, provision of such a deflection device 1e is a well-known measure to the person skilled in the art, so that a more detailed description thereof is omitted for brevity and conciseness.

According to the present invention, the actuating system 1 comprises at least one latching device 3, which is described in more detail below with reference to FIG. 2 and FIG. 3. It should be noted that the actuating system 1 illustratively comprises eight such latching devices, but for simplicity and clarity of the drawings, only a single latching device is labelled with the reference sign "3" and described below with reference to FIG. 2 and FIG. 3 representative for all eight latching devices.

Figure 2:
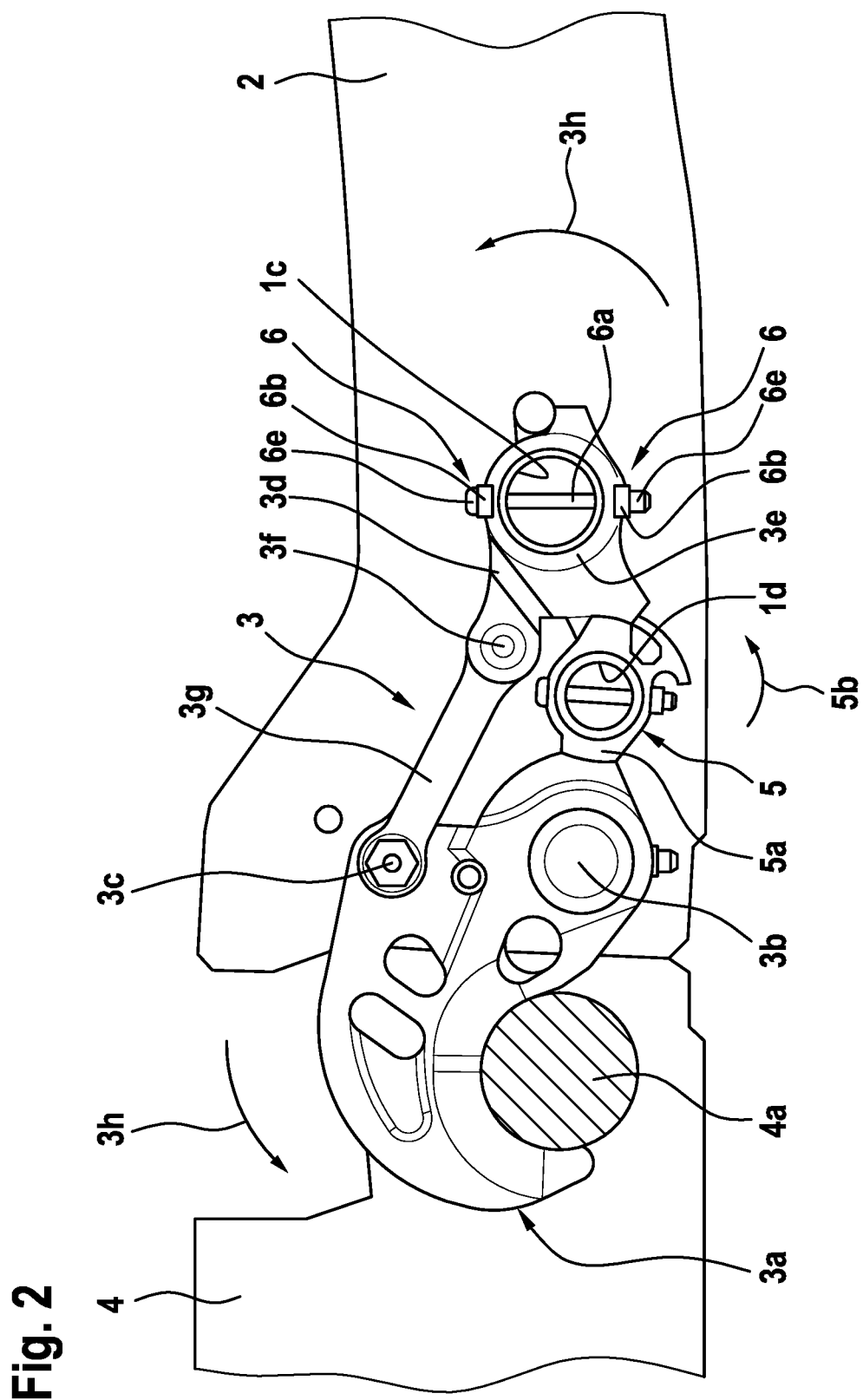
FIG. 2 shows a side view of a section of the actuatable door of FIG. 1 with a door frame and a single latching device with an associated locking device according to the present invention.
Figure 3:
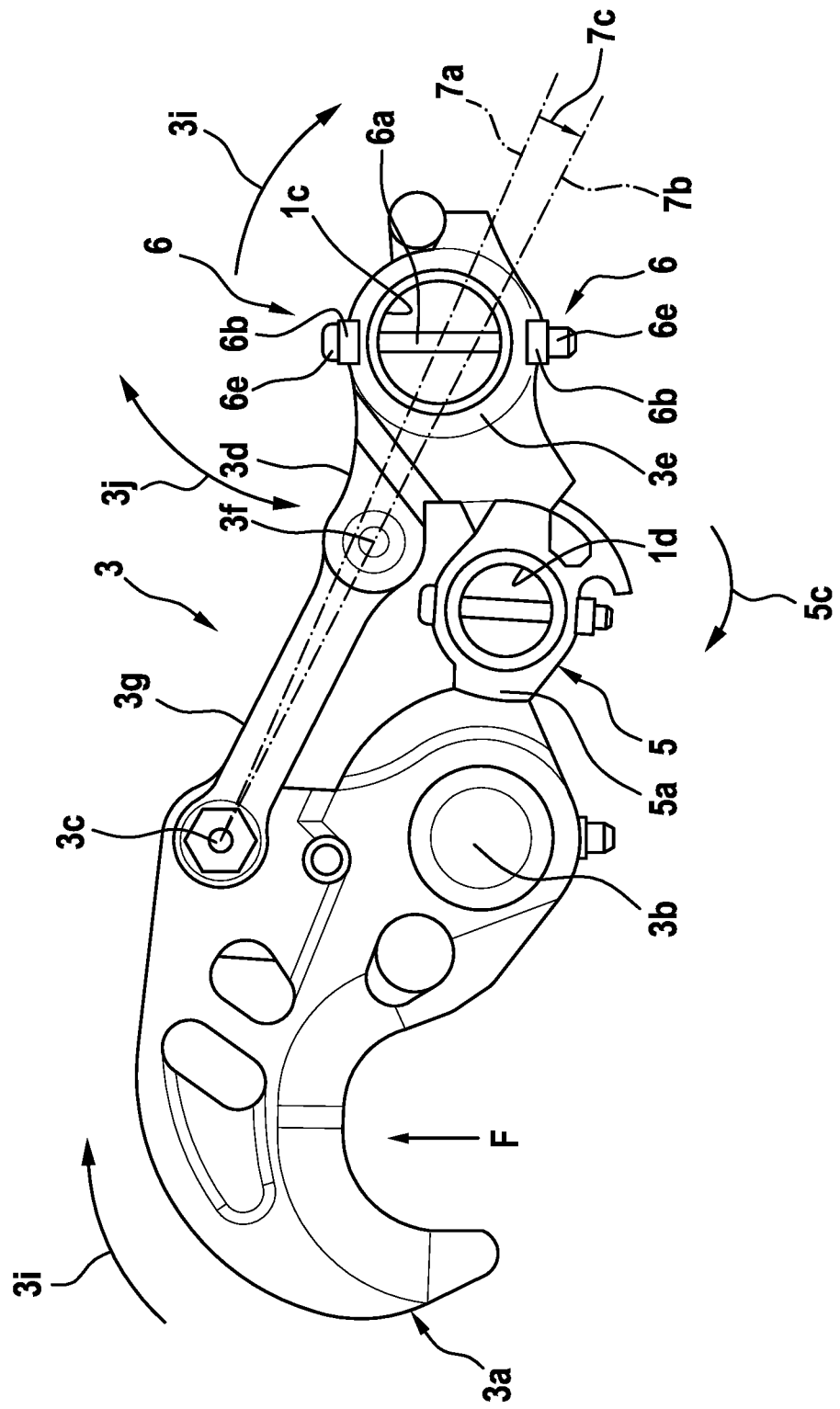
FIG. 3 shows the latching device and the locking device of FIG. 2.

FIG. 2 shows the latching device 3 of FIG. 1, which is exemplarily shown in a locking position, illustratively mounted to the cargo door 2 of FIG. 1 and preferably adapted for locking this cargo door 2 in a closed position in an associated door frame 4, which is e.g. defined by a fuselage of an aircraft as described above and, preferentially, associated with a cargo compartment thereof. Therefore, the latching device 3 comprises a latching hook 3a, which is pivotally mounted to an associated pivot bearing 3b and lockable at an associated counter peg 4a provided at the door frame 4.

According to one aspect of the present invention, the latching hook 3a is pivotally mounted to an associated pivot bearing 3b and connected to a pivotable mechanical transmission element 3d via a coupling link 3g. The latter is preferably embodied as a coupling rod and, therefore, also referred to as the "coupling rod 3g" hereinafter.

The coupling rod 3g is preferably pivotally mounted to the latching hook 3a and to the pivotable mechanical transmission element 3d. Illustratively, the coupling rod 3g is on the one hand pivotally mounted to the latching hook 3a by means of a connecting element 3c, e.g. a connecting bolt, which defines preferably a plain bearing between the coupling rod 3g and the latching hook 3a. On the other hand, the coupling rod 3g is pivotally mounted to the pivotable mechanical transmission element 3d by means of a connecting element 3f, e.g. a connecting bolt, which defines preferably a plain bearing between the coupling rod 3g and the pivotable mechanical transmission element 3d.

The pivotable mechanical transmission element 3d is preferably embodied as a bell crank and, therefore, also referred to as the "bell crank 3d" hereinafter. The latter is preferentially pivotally mounted to an associated pivot bearing 3e.

According to one aspect of the present invention, the pivot bearing 3e is established by coupling the bell crank 3g to the rotatable latching shaft 1c of FIG. 1. Thus, by rotating the rotatable latching shaft 1c around its rotation axis (1h in FIG. 4), the bell crank 3d is entrained by the rotatable latching shaft 1c into a pivotal movement around this rotation axis (1h in FIG. 4).

Preferably, the bell crank 3d is further coupled to at least one locking device 5a that is provided and adapted for securing the latching hook 3a in its locked state. The locking device 5 illustratively comprises a locking cam 5a which is preferentially adapted on the one hand for locking the latching hook 3a in its locked state and, on the other hand, for blocking the bell crank 3d at the same time in an overcentered position, as described in more detail below with reference to FIG. 3. The locking cam 5a is rigidly attached to the locking shaft 1d of FIG. 1 and, thus, rotatable by means of this locking shaft 1d.

According to one aspect of the present invention, for pivoting the bell crank 3d into its overcentered position, an overcentering adjustment device 6 is provided. This overcentering adjustment device 6 is illustratively associated with the pivot bearing 3e and preferably adapted for pivoting the bell crank 3d in operation at least from an in-line position with the coupling rod 3g into the overcentered position. The in-line position corresponds to a first position wherein the latching hook 3a is in its locked state and unlocking due to an external back driving force (F in FIG. 3) acting on the latching hook 3a is possible, while the overcentered position corresponds to a second position wherein the latching hook 3a is in its locked state and unlocking due to an external back driving force (F in FIG. 3) acting on the latching hook 3a is prevented.

Preferably, the overcentering adjustment device 6 comprises at least one overcentering bolt 6a that is rigidly mounted to the rotatable latching shaft 1c and that mounts the bell crank 3d to the rotatable latching shaft 1c such that the bell crank 3d is pivotable relative to the rotatable latching shaft 1c up to a predetermined maximum angle of rotation (7c in FIG. 3), which is preferentially greater than 0°. More specifically, the predetermined maximum angle of rotation (7c in FIG. 3) is preferably greater than a minimum required overcentering angle under consideration of all accumulated tolerances of all involved elements, which can respectively be determined in an application-specific manner.

The overcentering adjustment device 6 preferably further comprises at least one and illustratively two overcentering sliders 6b that are retained at the bell crank 3d by means of associated overcentering bolt nuts 6e. The overcentering adjustment device 6 and a preferred functionality thereof are described in greater detail below with reference to FIG. 4.

In operation of the latching device 3 and, more particularly for pivoting the latching hook 3a from a corresponding releasing position into its illustrated locking position during a respective latching procedure, the rotatable latching shaft 1c is rotated by means of the actuating device 1a of FIG. 1 in a latching rotation direction 3h. The bell crank 3d is pivoted together with the rotatable latching shaft 1c in the latching rotation direction 3h, thereby pushing the coupling rod 3g towards the latching hook 3a, which is, thus, pivoted around the associated pivot bearing 3b in the latching rotation direction 3h until it is locked at the counter peg 4a. By pivoting the bell crank 3d subsequently further into its overcentered position using the overcentering adjustment device 6, an inadvertent and/or accidental releasing of the latching device 3 is securely and reliably prevented.

Subsequently, the locking shaft 1d is rotated by means of the actuating device 1a of FIG. 1 in a locking rotation direction 5b until the locking cam 5a, which is entrained by the locking shaft 1d, reaches a predetermined blocking position. In this blocking position, which is exemplarily illustrated in FIG. 2, the locking cam 5a prevents a rotation of the latching hook 3a and/or the bell crank 3d in an unlatching rotation direction (3i in FIG. 3) opposed to the latching rotation direction 3h, so that prevention of the inadvertent and/or accidental releasing of the latching device 3 is further secured and supported.

FIG. 3 shows the latching device 3 of FIG. 2 for illustrating an exemplary unlatching procedure and for further illustrating the overcentered position of the bell crank 3d. More specifically, as described above the overcentered position of the bell crank 3d is reached when the latter is pivoted a predetermined maximum angle of rotation 7c that is greater than a minimum required overcentering angle under consideration of all accumulated tolerances of all involved elements. The predetermined maximum angle of rotation 7c is preferably defined between a virtual overcentering line 7a, which is defined as a line extending from a rotation axis defined by the connecting element 3c through the rotation axis (1h in FIG. 4) of the rotatable latching shaft 1c, and an existing coupling rod longitudinal extension line respectively middle axis 7b. Preferably, as long as the predetermined maximum angle of rotation 7c is greater than 0°, the bell crank 3d is in its overcentered position.

According to one aspect of the present invention, an unlatching procedure for unlatching the latching device 3 starts with rotating the locking shaft 1d by means of the actuating device 1a of FIG. 1 in an unlocking rotation direction 5c until the locking cam 5a, which is entrained by the locking shaft 1d, reaches a predetermined unblocking position, wherein the latching hook 3a is released. Subsequently, the rotatable latching shaft 1c is rotated by means of the actuating device 1a of FIG. 1 in an unlatching rotation direction 3i, thereby pivoting the bell crank 3d in this unlatching rotation direction 3i, which consequently pulls the coupling rod 3g in one of possible movement directions 3j of the connecting element 3f, which corresponds to the unlatching rotation direction 3i. Thus, the latching hook 3a is entrained by the coupling rod 3g and pivoted around the associated pivot bearing 3b in the unlatching rotation direction 3i until it releases the counter peg 4a of FIG. 2.

FIG. 3 further illustrates the securing function of the bell crank 3d in its overcentered position, which is established by means of the overcentering adjustment device 6, as the latching hook 3a cannot be pivoted around the associated pivot bearing 3b in response to an external back driving force F. More specifically, if such an external back driving force F acts on the latching hook 3a, the latter is pivoted around the associated pivot bearing 3b in the unlatching rotation direction 3i. Consequently, the latching hook 3a pushes the coupling rod 3g, which acts via the connecting element 3f on the bell crank 3d for pivoting the latter into the latching rotation direction 3h of FIG. 2, which is, however, opposed to the unlatching rotation direction 3i.

Figure 4:
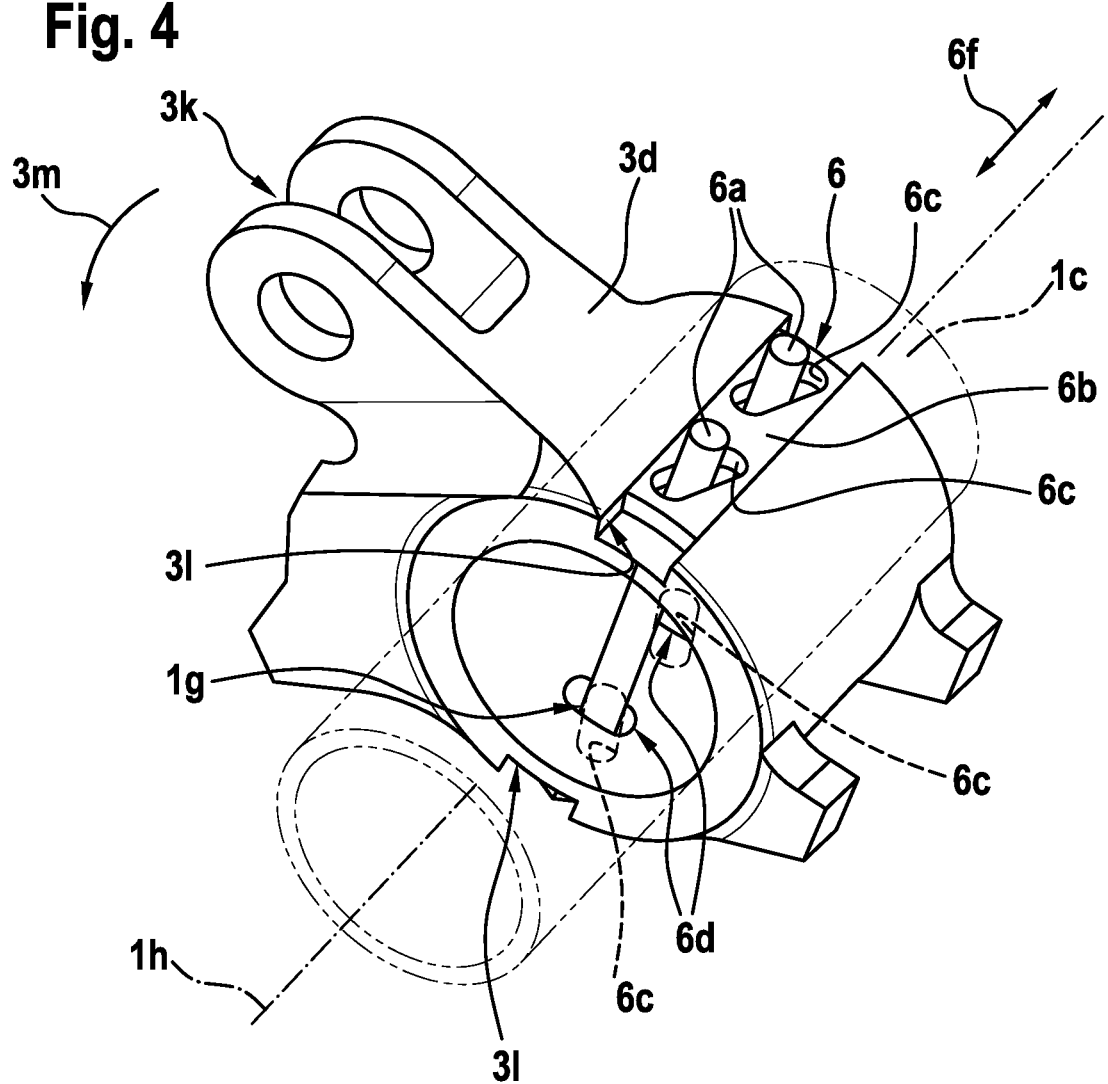
FIG. 4 shows a perspective view of a bell crank and a latching shaft for implementation of the latching device of FIG. 2 and FIG. 3, with an overcentering adjustment device according to the present invention.

FIG. 4 shows the bell crank 3d of FIG. 2 and FIG. 3, which is illustratively provided with a clevis 3k for pivotal mounting of the coupling rod 3g of FIG. 2 and FIG. 3 and which is coupled to the rotatable latching shaft 1c of FIG. 1 to FIG. 3, for further illustrating the overcentering adjustment device 6 of FIG. 2 and FIG. 3. As described above, the overcentering adjustment device 6 preferably comprises the at least one and preferably two overcentering bolts 6a as well as the at least one and illustratively two overcentering sliders 6b that are retained at the bell crank 3d by means of the associated overcentering bolt nuts 6e.

As described above, the overcentering bolts 6a are rigidly mounted to the rotatable latching shaft 1c. More specifically, the overcentering bolts 6a are preferably arranged in form-fit manner in corresponding through holes 1g of the rotatable latching shaft 1c, which are, preferentially, provided on diametrically opposed sides of the rotatable latching shaft 1c. Optionally, the overcentering bolts 6a can be fixed in the through holes 1g, e.g. by means of bonding, gluing or screwing.

According to one aspect of the present invention, the overcentering bolts 6a extend radially from the rotatable latching shaft 1c and pass at least partly through corresponding overcentering holes 6d provided in the bell crank 3d. Preferably, each overcentering hole 6d is provided as a long hole oriented at least approximately perpendicular to a longitudinal extension of the rotatable latching shaft 1c, which is defined by its rotation axis 1h. The dimensions of the overcentering holes 6d are predetermined such that the overcentering bolts 6a and the overcentering holes 6d are movable relative to each other.

Preferably, the overcentering bolts 6a are coupled to the overcentering sliders 6b, which are movably arranged on the bell crank 3d into corresponding longitudinal movement directions that are illustrated with an arrow 6f. Illustratively, one overcentering slider 6b is arranged on the bell crank 3d on each diametrically opposed side of the rotatable latching shaft 1c, preferably in an associated guide structure 3l provided in or on the outer circumference of the bell crank 3d, such as a guide groove.

According to one aspect of the present invention, at least one and illustratively each overcentering slider 6b comprises at least one and illustratively two overcentering guide openings 6c, which are preferably embodied as long holes that are oriented transversely to the overcentering holes 6d of the bell crank 3d. "Transversely" preferentially refers to any configuration different than congruent. Thus, the shown angle of approximately 40° should not be construed as limiting the present invention thereto, but is merely shown for purposes of illustration.

In operation, i.e. for pivoting the bell crank 3d in an overcentering rotation direction 3m into its overcentered position of FIG. 2 and FIG. 3, the two overcentering sliders 6b are preferably glidingly moved in the longitudinal movement direction 6f out of the plane of the drawing sheet, while the rotatable latching shaft 1c is immobilized. Thereby, the overcentering guide openings 6c of the overcentering sliders 6b move along the overcentering bolts 6a such that an initial rotational position of the overcentering sliders 6b is shifted relative to the immobilized rotatable latching shaft 1c. Consequently, the overcentering sliders 6b entrain the bell crank 3d into a pivotal movement around the rotation axis 1h of the rotatable latching shaft 1c, whereby the overcentering holes 6d of the bell crank 3d move along the overcentering bolts 6a. Accordingly, a longitudinal movement of the overcentering sliders 6b in operation is transformed into pivoting of the bell crank 3d relative to the rotatable latching shaft 1c.

Subsequently, i.e. when the bell crank 3d has reached its overcentered position, the overcentering sliders 6b are preferably blocked in their respective longitudinal positions in the guide grooves 3l by means of the overcentering bolt nuts 6e of FIG. 2 and FIG. 3. This is, however, a measure which is well-known to the person skilled in the art and, therefore, not described and illustrated in greater detail.

For moving the bell crank 3d back out of its overcentered position, the overcentering sliders 6b are preferably glidingly moved in the longitudinal movement direction 6f into the plane of the drawing sheet, while the rotatable latching shaft 1c is immobilized. Alternatively, the rotatable latching shaft 1c itself is simply rotated into the unlatching rotation direction 3i.

Figure 5:
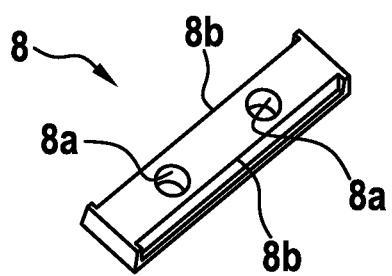
FIG. 5 shows a perspective view of an overcentering shim holder according to the present invention.

FIG. 5 shows an overcentering shim holder 8 according to one aspect of the present invention, which can be used instead of the overcentering sliders 6b of FIG. 4. In this case, the overcentering shim holder 8 is coupled to the overcentering bolts 6a of FIG. 4. Therefore, the overcentering shim holder 8 comprises at least one and illustratively two shim holder holes 6a and preferably at least two lateral shim pockets 8b.

Preferably, corresponding shims are in the two lateral shim pockets 8b, so that an underlying distribution of the shims in the two lateral shim pockets 8b can be used to force rotation of the bell crank 3d. Thereby, a maximum possible tilting respectively further pivoting of the bell crank 3d is defined by a total depth of the two lateral shim pockets 8b with a respective distribution of the corresponding shims to one side or the other.

It should be noted that modifications to the above described embodiments are within the common knowledge of the person skilled in the art and, thus, also considered as being part of the present invention. It should further be noted that, as described above, each latching device according to the present invention requires five components less than the conventional latching device of the document DE 198 25 405 C2, so that in the actuating system 1 of FIG. 1 with eight latching devices a total of forty components can be economized. Thus, a more compact and shorter, lighter and cheaper latching device can be provided.

REFERENCE LIST 1 actuating system
1a actuating device
1b operating handle
1c latching shaft
1d locking shaft
1e deflection device
1f conventional latching shaft carrier
1g latching shaft through hole
1h latching shaft longitudinal extension and rotation axis
2 actuatable door
3 latching device
3a latching hook
3b latching hook pivot bearing
3c latching hook connecting element
3d bell crank
3e bell crank pivot bearing
3f bell crank connecting element
3g coupling link
3h latching rotation direction
3i unlatching rotation direction
3j bell crank connecting element movement directions
3k bell crank clevis
3l bell crank guide groove
3m bell crank overcentering rotation direction
4 door frame
4a counter peg
5 locking device
5a locking cam
5b locking rotation direction
5c unlocking rotation direction
6 overcentering adjustment device
6a overcentering bolts
6b overcentering slider
6c slider guide tilted overcentering guide openings
6d bell crank overcentering holes
6e overcentering bolt nuts
6f slider overcentering movement directions
7a virtual overcentering line
7b coupling link longitudinal extension line
7c overcentering angle
8 overcentering shim holder
8a shim holder holes
8b shim holder pockets

What is claimed is:

1. An actuating system for an actuatable door, the actuating system comprising an actuatable rotatable latching shaft and at least one latching device, the at least one latching device comprising a latching hook, an associated pivot bearing, a pivotable mechanical transmission element and a coupling link, wherein the latching hook is adapted for locking the actuatable door in a closed position, the latching hook being pivotally mounted to the associated pivot bearing and connected to the pivotable mechanical transmission element via the coupling link, the coupling link being pivotally mounted to the latching hook and to the pivotable mechanical transmission element, the pivotable mechanical transmission element being coupled to the rotatable latching shaft such that rotation of the rotatable latching shaft in operation upon actuation results in pivoting of the pivotable mechanical transmission element and pivoting of the latching hook around the associated pivot bearing, wherein the pivotable mechanical transmission element is mounted onto the rotatable latching shaft;

wherein an overcentering adjustment device is provided, the overcentering adjustment device being adapted for pivoting the pivotable mechanical transmission element in operation at least from an in-line position into an overcentered position, the in-line position corresponding to a first position wherein the latching hook is in locked state and unlocking due to a back driving force acting on the latching hook is possible, and the overcentered position corresponding to a second position wherein the latching hook is in the locked state and unlocking due to a back driving force acting on the latching hook is prevented;

wherein the overcentering adjustment device comprises at least one overcentering bolt that is rigidly mounted to the rotatable latching shaft, the at least one overcentering bolt passing at least partly through an overcentering hole provided in the pivotable mechanical transmission element;

wherein the overcentering hole is provided as a long hole oriented at least approximately perpendicular to a longitudinal extension of the rotatable latching shaft;

wherein the at least one overcentering bolt and the long hole are movable relative to each other;

wherein at least one overcentering slider is provided, the overcentering slider being coupled to the at least one overcentering bolt;

wherein the at least one overcentering slider comprises at least one overcentering guide opening, the at least one overcentering guide opening being embodied as a long hole that is oriented transversely to the overcentering hole; and wherein the at least one overcentering slider is movably arranged on the pivotable mechanical transmission element, wherein a longitudinal movement of the overcentering slider in operation is transformed into pivoting of the pivotable mechanical transmission element relative to the rotatable latching shaft.

2. The actuating system according to claim 1, wherein the pivotable mechanical transmission element comprises at least one bell crank.

3. The actuating system according to claim 1, wherein the coupling link comprises at least one coupling rod.

4. The actuating system according to claim 1, wherein the pivotable mechanical transmission element is pivotable relative to the rotatable latching shaft up to a predetermined maximum angle of rotation, the predetermined maximum angle of rotation being greater than 0°.

5. The actuating system according to claim 4, wherein the predetermined maximum angle of rotation is greater than a minimum required overcentering angle under consideration of all accumulated tolerances of all involved elements.

6. The actuating system according to claim 1, wherein at least one overcentering shim holder is provided, the overcentering shim holder being coupled to the at least one overcentering bolt and comprising at least two lateral shim pockets.

7. The actuating system according to claim 1, wherein at least one locking device is provided, the locking device comprising a locking cam for locking the latching hook in locked state.

8. An actuatable door, in particular for an aircraft, comprising an actuating system according to claim 1.

9. The actuating system according to claim 1, wherein at least one overcentering shim holder is provided, the overcentering shim holder being coupled to the at least one overcentering bolt and comprising at least two lateral shim pockets.

* * * * *